United States Patent
Machida

(10) Patent No.: US 7,675,020 B2
(45) Date of Patent: Mar. 9, 2010

(54) INPUT APPARATUS AND METHODS HAVING DIFFUSE AND SPECULAR TRACKING MODES

(75) Inventor: Akihiro Machida, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/510,890

(22) Filed: Aug. 28, 2006

(65) Prior Publication Data

US 2008/0061220 A1    Mar. 13, 2008

(51) Int. Cl.
G06M 7/00    (2006.01)
G01N 21/86    (2006.01)

(52) U.S. Cl. .................. 250/221; 250/559.29
(58) Field of Classification Search .......... 250/221, 250/559.32, 559.04, 559.29, 559.36; 345/157–167; 356/498, 337–343, 612, 614

See application file for complete search history.

(56) References Cited

U.S. PATENT DOCUMENTS

| | | | |
|---|---|---|---|
| 3,537,307 A | 11/1970 | Pliha | |
| 3,651,691 A | 3/1972 | Pliha | |
| 3,835,273 A | 9/1974 | Stolarik | |
| 4,495,814 A | 1/1985 | Steinke | |
| 4,844,602 A | 7/1989 | Kitagishi et al. | |
| 4,970,540 A | 11/1990 | Vasey et al. | |
| 5,139,339 A * | 8/1992 | Courtney et al. | 356/446 |
| 5,155,520 A | 10/1992 | Nagasaki et al. | |
| 5,274,361 A * | 12/1993 | Snow | 345/166 |
| 5,307,206 A | 4/1994 | Haessig, Jr. | |
| 5,578,813 A | 11/1996 | Allen et al. | |
| 5,644,139 A | 7/1997 | Allen et al. | |
| 5,794,078 A | 8/1998 | Okazaki | |
| 5,805,282 A | 9/1998 | Prior et al. | |
| 5,960,376 A | 9/1999 | Yamakado et al. | |
| 5,982,421 A | 11/1999 | Inou et al. | |
| 6,256,016 B1 * | 7/2001 | Piot et al. | 345/166 |
| 6,741,335 B2 | 5/2004 | Kinrot et al. | |
| 6,747,690 B2 | 6/2004 | Molgaard | |
| 6,927,758 B1 | 8/2005 | Piot et al. | |
| 7,126,586 B2 * | 10/2006 | Jianping et al. | 345/166 |
| 7,442,916 B2 * | 10/2008 | Lee et al. | 250/221 |
| 2002/0166756 A1 | 11/2002 | Thompson | |
| 2004/0227954 A1 | 11/2004 | Xie | |

(Continued)

FOREIGN PATENT DOCUMENTS

EP    525714    2/1993

(Continued)

OTHER PUBLICATIONS

"Optical translation measurement (OTM)," OTM Technologies, http://www.otmtech.com/otm.asp (downloaded Aug. 10, 2006).

*Primary Examiner*—Georgia Y Epps
*Assistant Examiner*—Pascal M Bui-Pho

(57) ABSTRACT

Input apparatus and methods are described. An object is illuminated with output light. Diffuse reflections of the output light from the object are captured. Diffuse reflection optical data is produced from the captured diffuse reflections. Specular reflections of the output light from the object are captured. Specular reflection optical data is produced from the captured specular reflections. A first set of motion measures indicative of movement in relation to the object is produced from the diffuse reflection optical data. A second set of motion measures indicative of movement in relation to the object is produced from the specular reflection optical data.

21 Claims, 7 Drawing Sheets

U.S. PATENT DOCUMENTS

| | | |
|---|---|---|
| 2005/0012022 A1 | 1/2005 | Lin |
| 2005/0057492 A1 | 3/2005 | Bathiche et al. |
| 2005/0094154 A1* | 5/2005 | Baney et al. ................ 356/499 |
| 2005/0095697 A1 | 5/2005 | Bachur et al. |
| 2005/0156875 A1 | 7/2005 | Kong |
| 2005/0157971 A1 | 7/2005 | Juijve et al. |
| 2005/0243055 A1 | 11/2005 | Ranta et al. |
| 2006/0072102 A1 | 4/2006 | Jianping et al. |
| 2006/0077398 A1* | 4/2006 | Cantin et al. ................ 356/512 |
| 2007/0291001 A1* | 12/2007 | Trisnadi et al. ............. 345/166 |
| 2007/0296699 A1* | 12/2007 | Bohn et al. ................. 345/166 |

FOREIGN PATENT DOCUMENTS

| | | |
|---|---|---|
| FR | 2707755 | 1/1995 |
| JP | 2000/097968 | 4/2000 |
| JP | 2004/073398 | 3/2004 |
| JP | 2006201621 | 8/2006 |

\* cited by examiner

INPUT APPARATUS AND METHODS HAVING DIFFUSE AND SPECULAR TRACKING MODES

CROSS-REFERENCE TO RELATED APPLICATIONS

This application relates to the co-pending U.S. patent application Ser. No. 11/232,619, filed Sep. 22, 2005, by Akihiro Machida, entitled "Image-Based Sensing of Acceleration," which is incorporated herein by reference.

BACKGROUND

Many different types of devices have been developed for inputting commands into a machine. For example, hand-manipulated input devices, such as computer mice, joysticks, trackballs, touchpads, and keyboards, commonly are used to input instructions into a computer by manipulating the input device. Such input devices allow a user to control movement of a virtual pointer, such as a cursor, across a computer screen, select or move an icon or other virtual object displayed on the computer screen, and open and close menu items corresponding to different input commands. Input devices commonly are used in both desktop computer systems and portable computing systems.

Input devices typically include a mechanism for converting a user input into user interface control signals, such as cursor position data and scrolling position and distance data. Although some types of input device use electromechanical transducers to convert user manipulation of the input device into user interface control signals, most recently developed input devices use optical navigation sensors to convert user manipulation of the input device into user interface control signals. The optical navigation sensors employ optical navigation technology that measures changes in position by acquiring a sequence of images of light reflecting from a surface and mathematically determining the direction and magnitude of movement over the surface from comparisons of corresponding features in the images. Such optical navigation systems typically track the scanned path of the input device based on detected pixel-to-pixel surface reflectivity differences that are captured in the images. These changes in reflectivity may be quite small depending upon the surface medium (e.g., on the order of 6% for white paper).

One problem with existing optical navigation sensors is that they are unable to navigate well on very smooth surfaces, such as glass, because the images reflected from such surfaces are insufficiently different to enable the direction and magnitude of movement over the surface to be determined reliably. In an attempt to solve this problem, optical navigation sensors have been proposed that illuminate smooth-surfaced objects with coherent light. The objects induce phase patterns in the illuminating light that are correlated with optical nonuniformities in or on the objects. Optical navigation sensors of this type include an interferometer that converts the phase patterns into interference patterns (or interferograms) that are used to determine relative movement with respect to the objects. Although this approach improves navigation performance over specular surfaces, uniform surfaces, and surfaces with shallow features, this approach relies on optical nonuniformities, such as scratches, imperfections, and particulate matter in or on the surface to produce the phase patterns that are converted into the interferograms by the component interferometers. As a result, this approach is unable to navigate reliably over surfaces that are free of such specular features.

What are needed are input systems and methods that are capable of accurately navigating over different types of surfaces, such as, opaque surfaces, specular surfaces, smooth surfaces containing optical nonuniformities, and smooth surfaces that are free of specular nonuniformities.

SUMMARY

In one aspect, the invention features an apparatus that includes an illumination system, a diffuse reflection capture system, a specular reflection capture system, and a processing system. The illumination system illuminates an object with output light. The diffuse reflection capture system captures diffuse reflections of the output light from the object and produces diffuse reflection optical data from the captured diffuse reflections. The specular reflection capture system captures specular reflections of the output light from the object and produces specular reflection optical data from the captured specular reflections. The processing system produces a first set of motion measures indicative of movement in relation to the object from the diffuse reflection optical data and produces a second set of motion measures indicative of movement in relation to the object from the specular reflection optical data.

In another aspect, the invention features a method in accordance with which an object is illuminated with output light. Diffuse reflections of the output light from the object are captured. Diffuse reflection optical data is produced from the captured diffuse reflections. Specular reflections of the output light from the object are captured. Specular reflection optical data is produced from the captured specular reflections. A first set of motion measures indicative of movement in relation to the object is produced from the diffuse reflection optical data. A second set of motion measures indicative of movement in relation to the object is produced from the specular reflection optical data.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below provide input apparatus that include multiple capture systems that are designed to capture light reflections from different types of surfaces. In this way, these embodiments enable optical navigation over multiple types of surfaces (e.g., opaque surfaces, specular surfaces, smooth surfaces containing optical nonuniformities, and smooth surfaces that are free of specular nonuniformities) using a single input apparatus.

II. Overview

Figure 1:
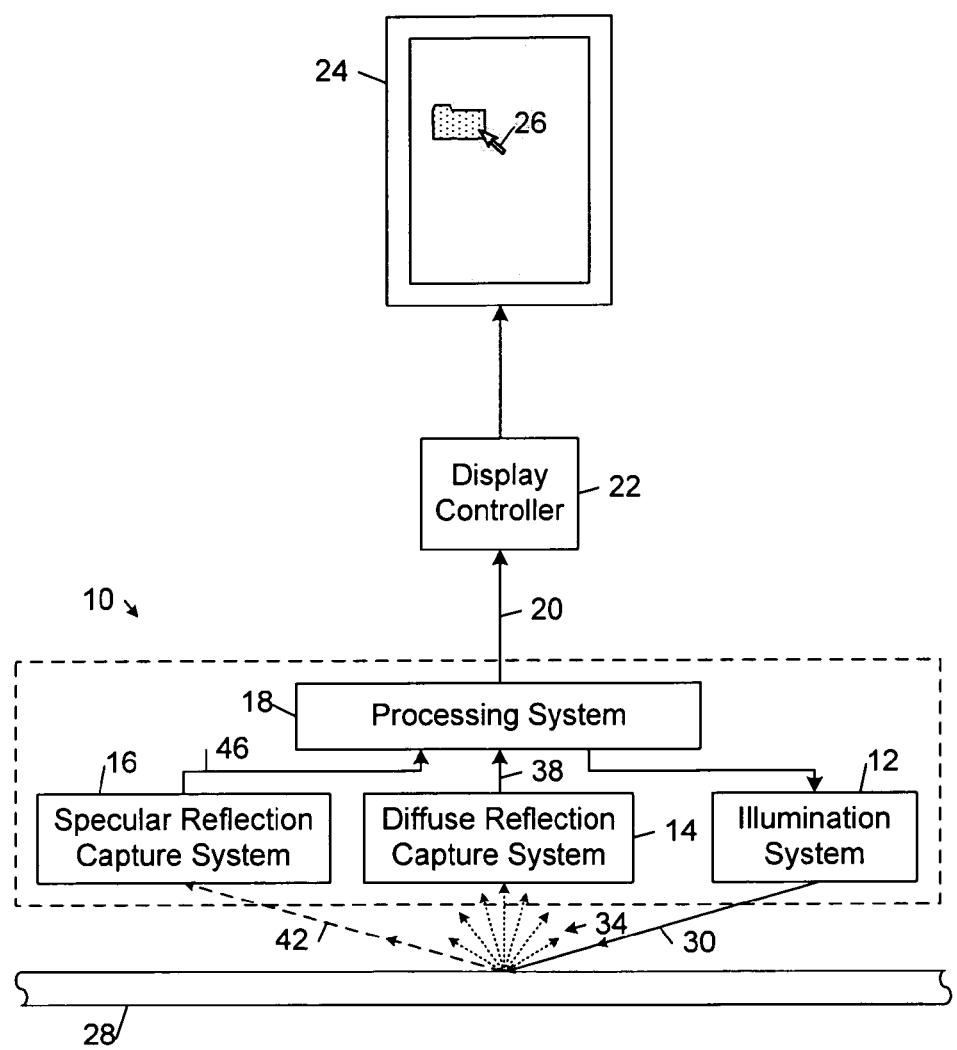
FIG. 1 is a block diagram of an embodiment of an input apparatus that includes an illumination system, a specular reflection capture system, a diffuse reflection capture system, and a processing system in an exemplary operational environment.

FIG. 1 shows an embodiment of an input apparatus 10 that includes an illumination system 12, a diffuse reflection capture system 14, a specular reflection capture system 16, and a processing system 18.

In general, the input apparatus 10 may be incorporated into any type of device or system in which sensing click events serves a useful purpose. For illustrative purposes, the input apparatus 10 is described herein as a component of a device for inputting commands into a machine, where the input apparatus 10 may have any of a wide variety of different form factors (e.g., a computer mouse). In these implementations, the input apparatus 10 may be configured to sense user manipulations of a component of the input device (e.g., an input contact surface) or manipulations of the input device itself (e.g., movement of the input device across a surface).

In the illustrative operational environment shown in FIG. 1, the input apparatus 10 outputs display control signals 20 to a display controller 22 that drives a display 24. The display control signals 20 typically are in the form of motion measures that are derived from optical data that are generated by one or both of the diffuse reflection capture system 14 and the specular reflection capture system 16. The motion measures typically correspond to one or more of displacement parameter values, velocity parameter values, and acceleration parameter values. The display controller 22 processes the display control signals 20 to control, for example, the movement of a pointer 26 on the display 24. The display controller 22 typically executes a driver to process the display control signals 20. In general, the driver may be implemented in any computing or processing environment, including in digital electronic circuitry or in computer hardware, firmware, or software. In some embodiments, the driver is a component of an operating system or a software application program. The display 24 may be, for example, a flat panel display, such as a LCD (liquid crystal display), a plasma display, an EL display (electro-luminescent display) and a FED (field emission display).

In some embodiments, the input apparatus 10 and the display 24 are implemented as separate discrete devices, such as a separate pointing device and a remote display-based system. In these embodiments, the remote system may be any type of display-based appliance that receives user input, including a general-purpose computer system, a special-purpose computer system, and a video game system. The display control signals 20 may be transmitted to the remote system over a wired communication link (e.g., a serial communication link, such as an RS-232 serial port, a universal serial bus, or a PS/2 port) or a wireless communication link (e.g., an infrared (IR) wireless link or a radio frequency (RF) wireless link). In other embodiments, the input apparatus 10 and the display 24 are integrated into a single unitary device, such as a portable (e.g., handheld) electronic device. The portable electronic device may be any type of device that can be readily carried by a person, including a cellular telephone, a cordless telephone, a pager, a personal digital assistant (PDA), a digital audio player, a digital camera, and a digital video game console.

Figure 2:
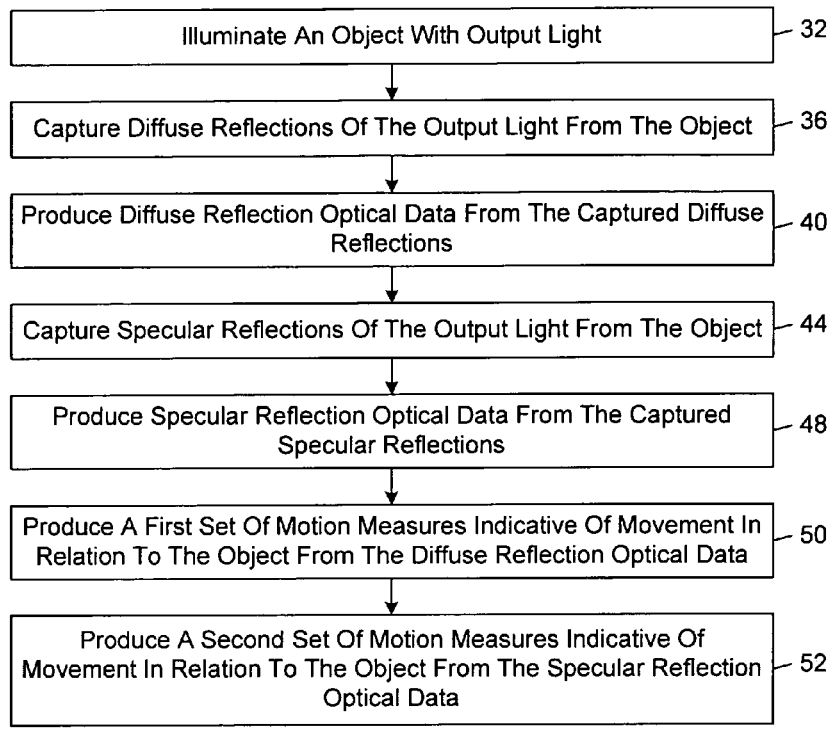
FIG. 2 is a flow diagram of an embodiment of an input method.

FIG. 2 shows an embodiment of an input method that is implemented by the input apparatus 10. In accordance with this method, the illumination system illuminates an object 28 with output light 30 (FIG. 2, block 32). The diffuse reflection capture system captures diffuse reflections 34 of the output light 30 from the object 28 (FIG. 2, block 36). The diffuse reflection capture system 14 produces diffuse reflection optical data 38 from the captured diffuse reflections 34 (FIG. 1, block 40). The specular reflection capture system 16 captures specular reflections 42 of the output light 30 from the object 28 (FIG. 2, block 44). The specular reflection capture system 16 produces specular reflection optical data 46, from the captured specular reflections 42 (FIG. 2, block 48). The processing system 18 produces a first set of motion measures indicative of movement in relation to the object 28 from the diffuse reflection optical data 38 (FIG. 2, block 50). The processing system 18 produces a second set of motion measures indicative of movement in relation to the object 28 from the specular reflection optical data 46 (FIG. 2, block 52).

The properties of the output light 28 and the optical properties of the object 28 determine the types of reflections that are produced in response to the incident output light 30. For example, in some cases, the object 28 has a surface with non-uniformities (e.g., particles, defects, or surface roughness) that scatters the incident output light 30 to produce primarily the diffuse reflections 34. In some embodiments, the illumination system 12 produces coherent output light 30 that interacts with the non-uniformities in the object 28 to produce diffuse reflections 34 that include speckle patterns. In other cases, the object 28 has a uniform, smooth surface that specularly reflects the incident output light 30 to produce primarily the specular reflections 42. In some other cases, the object 28 produces both diffuse reflections 34 and specular reflections 42.

In general, the processing system 18 may output motion measures that are generated from both the diffuse reflection optical data 38 and the specular reflection optical data 46. In some cases, however, the quality (e.g., intensity or contrast) of one of the diffuse reflections 34 and the specular reflections 42 carries superior feature information for optically tracking relative movement between the input apparatus 10 and the object 28. Indeed, in some cases, processing system 18 may be able to generate motion measures from only one of the diffuse reflection optical data 38 and the specular reflection optical data 46 because quality of one of the diffuse reflections 34 and the specular reflections 42 is too low to support optical navigation.

In some embodiments, the processing system 18 selects one of a diffuse reflection tracking state and a specular reflection tracking state based on an assessment of the tracking quality of the diffuse reflections 34 and the specular reflections 42.

Figure 3:
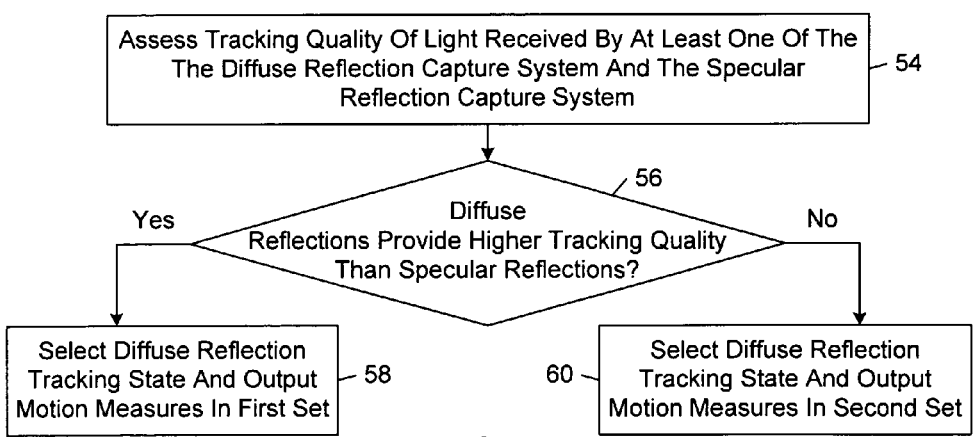
FIG. 3 is a flow diagram of an embodiment of an input method.

FIG. 3 shows an embodiment of an input method by which the processing system 18 selects between the diffuse reflection tracking state and the specular reflection tracking state. In accordance with this method, the processing system 18 assesses a tracking quality of light received by at least one of the diffuse reflection capture system 14 and the specular reflection capture system 16 (FIG. 3, block 54). If the assessed tracking quality indicates that the diffuse reflections 34 provide a higher tracking quality than the specular reflections 42 (FIG. 3, block 56), the processing system 18 selects the diffuse reflection tracking state and outputs motion measures in the first set that are generated from the diffuse reflection optical data 38 (FIG. 3, block 58). Otherwise, the processing system 18 selects the specular reflection tracking state and outputs motion measures in the second set that are generated from the specular reflection optical data 46 (FIG. 3, block 60).

In some embodiments, the processing system 18 assesses the tracking quality of the received light based on saliency measures that are derived from the diffuse reflection optical data 38 that is generated by the diffuse reflection capture system 14. These saliency measures provide a basis for assessing the visual quality of the received reflections.

In some of these embodiments, the saliency measures describe the quality of the features (e.g., texture, edges, corners, and other structural elements) in the received light. The processing system 18 derives these saliency measures by applying one or more saliency feature descriptor functions to images that are captured by the diffuse reflection capture system 14. In general, any one or more of a wide variety of different types of feature descriptors may be used to describe the image content within the captured images. The feature descriptors may be statistical, structural, or syntactic. Exemplary types of feature descriptors include: the level of contrast in the captured images; the magnitude (amplitude) of pixel values in the captured images; the energy of pixel values in the captured images; the standard deviation of pixel values in the captured images; the skewness of the gradient value distribution in the captured images; and the edge frequency in the captured images. The feature descriptors may be applied to individual pixels, local regions (e.g., block of 5×5 pixels), or all of the pixels of the captured images.

In other ones of these embodiments, each of the saliency measures describes a respective level of contrast in the corresponding ones of the images that are captured by the diffuse reflection capture system 14. In these embodiments, the corresponding captured image is passed through a high-pass spatial filter and the contrast level corresponds to a count of the pixels in the high-pass filter output that are above a specified threshold.

In other ones of these embodiments, each of the saliency measures describes a respective edge frequency in the corresponding image that is captured by the diffuse reflection capture system 14. In these embodiments, the processing system 18 may use any type of edge detection technique to find edges in the captured images. In one exemplary embodiment, the processing system 18 uses a Sobel edge detector to compute edge directions and magnitudes. The Sobel edge detector uses a pair of 3×3 convolution masks to perform a two-dimensional gradient measurement on the captured images, where one of the convolution masks estimates the gradient in the x-direction (e.g., columns) and the other convolution mask estimates the gradient in the y-direction (e.g., rows).

In some of these embodiments, the processing system 18 derives a saliency score for each of the images from the one or more saliency measures and compares the saliency score to an empirically determined saliency threshold. If the saliency score meets the threshold the processing system 18 selects the diffuse reflection tracking state. In some of these embodiments, the processing system 18 automatically selects the specular reflection tracking state in response to a determination that the saliency score does not meets the saliency threshold. In other ones of these embodiments, the processing system 18 selects the specular reflection tracking state only in response to a determination that the saliency score does not meet the saliency threshold and the intensity of the specular reflections meets an empirically determined intensity threshold.

In other embodiments, the processing system 18 selects the specular reflection tracking state in response to a determination that the intensity of the specular reflections meets an empirically determined intensity threshold. In some of these embodiments, the processing system 18 automatically selects the diffuse reflection tracking state in response to a determination that the specular reflection intensity does not meet the intensity threshold. In other ones of these embodiments, the processing system 18 selects the diffuse reflection tracking state only in response to a determination that the specular reflection intensity does not meet the intensity threshold and the saliency score meets an empirically determined saliency threshold.

III. Exemplary Embodiments of the Input Apparatus

Figure 4:
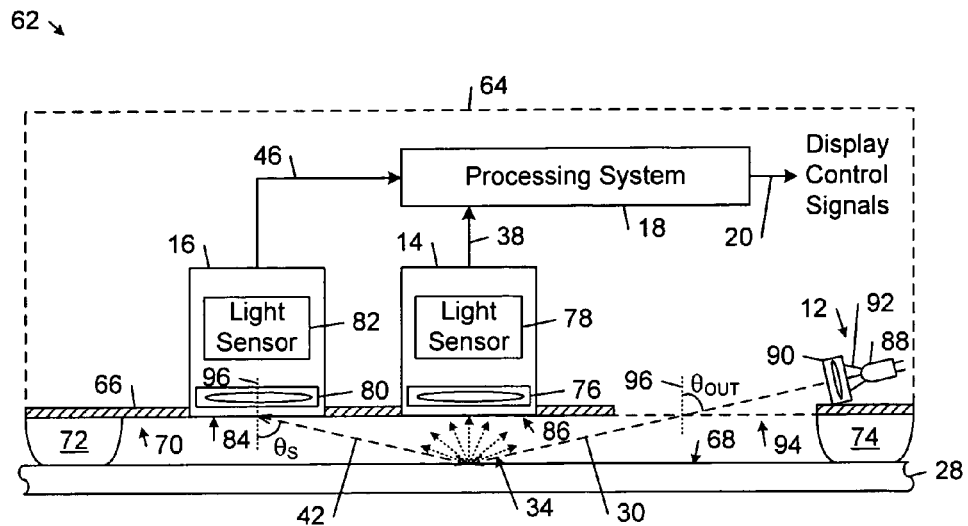
FIG. 4 is a block diagram of an embodiment of the input apparatus shown in FIG. 1.

FIG. 4 shows an embodiment 62 of the input apparatus 10 that includes a housing 64 that contains the illumination system 12, the diffuse reflection capture system 14, the specular reflection capture system 16, and the processing system 18. The housing 64 additionally includes a bottom side 66 that is configured to slide over a surface 68 of the object 28 (e.g., a tabletop). In this regard, the housing 64 includes a bottom registration surface 70 that supports a set of sliders 72, 74, which have low friction surfaces that facilitate sliding over the object surface 68. In this embodiment, the diffuse reflection capture system 14 includes an optical focusing system 76 and a light sensor 78, where the optical focusing system 76 includes one or more optical elements (e.g., refractive lenses, diffractive lenses, and optical filters) that focus light from a relatively short distance (e.g., 0.1 millimeter to 10 millimeters) away from the registration surface 70 of the housing 64 onto an active area (or capture plane) of the light sensor 78. Similarly, the specular reflection capture system 16 includes an optical focusing system 80 and a light sensor 82, where the optical focusing system 80 includes one or more optical elements (e.g., refractive lenses, diffractive lenses, and optical filters) that focus light from a relatively short distance (e.g., 0.1 millimeter to 10 millimeters) away from the registration surface 70 of the housing 64 onto an active area (or capture plane) of the light sensor 82. The heights of the sliders 72, 74 typically are set so that the front focal planes of the optical focusing systems 76, 80 coincide with the object surface 68 when the input apparatus 62 is placed against the object surface 68. The optical focusing systems 76, 80 receive light through optical ports 84, 86 in the registration surface 70 of the housing 64.

In the illustrated embodiment, the illumination system 12 is implemented by a light source 88 (e.g., a light emitting diode or a laser) and an optical element 90 that collimates the light 92 that is produced by the light source 12 into a collimated output light beam 30, which exits the housing 64 through an optical port 94 that is defined in the registration surface 70 of the housing 64. The illumination system 12 is oriented to direct the output light beam 30 toward the object 68 to produce the specularly reflected beam 42 when the registration surface 70 of the housing 64 is adjacent the surface 68 of the object 28. In particular, the illumination system is configured to direct the output light beam 30 along an outgoing beam path at an acute angle $\theta_{OUT}$ greater than zero relative to a normal axis 96 perpendicular to the registration surface 70. The specular reflection capture system 16 is configured to capture at least a portion of the output light beam 30 that specularly reflects from the object surface 68 into the housing 64 along an incoming beam path 42 at an angle $\theta_S$ relative to the normal axis 96 and equal to $\theta_{OUT}$. The diffuse reflection capture system 14 is configured to capture at least a portion of the output light beam 30 that diffusely reflects from the object 12 into the housing 64 along a range of incoming beam paths including a direction parallel to the normal axis 96. In the illustrated embodiment, the diffuse reflection capture system 14 is positioned directly above the location where the output light beam 30 is expected to illuminate the object surface 68.

IV. Exemplary Embodiments of Components of the Input Apparatus

A. Exemplary Capture System Embodiments

In general, the diffuse reflection capture system 14 and the specular reflection capture system 16 may utilize the same light detection technology or different light detection technology. The light detection technology that is used by the diffuse reflection capture system 14 typically is selected to detect features in the diffuse reflections 34 that change with changes in the relative positions of the input apparatus 10 and the object 28. The light detection technology that is used by the specular reflection capture system 16 typically is selected to detect features in the specular reflections 42 that change with changes in the relative positions of the input apparatus 10 and the object 28.

1. Exemplary Image-Based Capture System Embodiments

Figure 5:
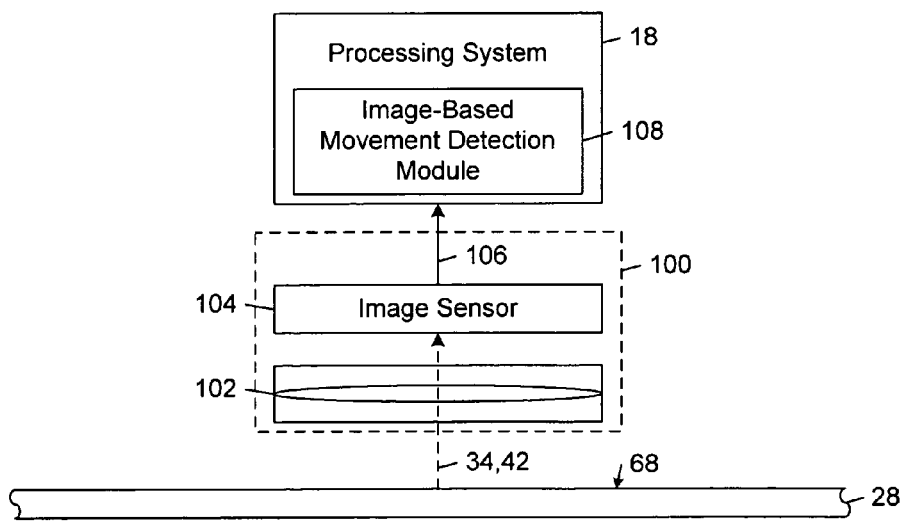
FIG. 5 is a block diagram of an image-based embodiment of the diffuse reflection capture system shown in FIG. 1.

FIG. 5 shows an embodiment 100 of the diffuse reflection capture system 14 that includes an optical focusing system 102 and an image sensor 104. The optical focusing system 102 typically includes one or more optical elements that focus light from the object surface 68 onto the active area (or capture plane) of the image sensor 104. The image sensor 104 may be any form of imaging device that is capable of capturing one-dimensional or two-dimensional images of the object surface 68. Exemplary image sensing devices include one-dimensional and two-dimensional CMOS (Complimentary Metal-Oxide Semiconductor) image sensors, and CCD (Charge-Coupled Device) image sensors. In some implementations, the image sensor 104 captures images 106 at a rate (e.g., 1500 pictures or frames per second) that is fast enough so that sequential pictures of the object surface 68 overlap.

The captured images 106 are processed by an image-based movement detection module 108. In the illustrated embodiment, the image-based movement detection module 108 is part of the processing system 18. In other embodiments, the image-based movement detection module 108 is a separate component of the input apparatus 10. The image-based movement detection module 108 is not limited to any particular hardware or software configuration, but rather it may be implemented in any computing or processing environment, including in digital electronic circuitry or in computer hardware, firmware, or software. In one implementation, the image-based movement detection module 108 includes a digital signal processor (DSP). In some embodiments, the capture system 100 and the image-based movement detection module 108 are implemented by an optical mouse navigation sensor module (e.g., an optical mouse navigation sensor available from Avago Technologies, Inc. of San Jose, Calif., U.S.A.).

In operation, the image-based movement detection module 108 detects relative movement between the input apparatus 10 and the object surface 68 based on comparisons between images 106 of the surface 68 that are captured by the image sensor 104. In some implementations, the image-based movement detection module 108 correlates features identified in successive ones of the images 106 to provide information relating to the positions of the object surface 68 relative to the image sensor 104. In general, any type of correlation method may be used to track the positions of features across successive ones of the images 106. In some embodiments, a sum of squared differences correlation method is used to find the locations of identical features in successive images 106 in order to determine the displacements of the features across the images 106. In some of these embodiments, the displacements are summed or integrated over a number of images. The resulting integration values may be scaled to compensate for any image scaling by the optics associated with the image sensor 104. The image-based movement detection module 108 translates the displacement information into two-dimensional relative motion vectors (e.g., X and Y motion vectors) that describe the relative movement of the input device 10 across the surface 68. The processing system 18 produces the display control signals 20 from the two-dimensional motion vectors.

In operation, the diffuse reflection capture system 100 identifies texture, speckle, or other features in the images and tracks the motion of such features across multiple images. These features may be, for example, inherent to the object surface 68, relief patterns embossed on the object surface 68, or marking patterns printed on the object surface 68. The image-based movement detection module 108 identifies common features in sequential images 106 and outputs motion measures corresponding to the direction and distance by which the identified common features are shifted or displaced.

Figure 6:
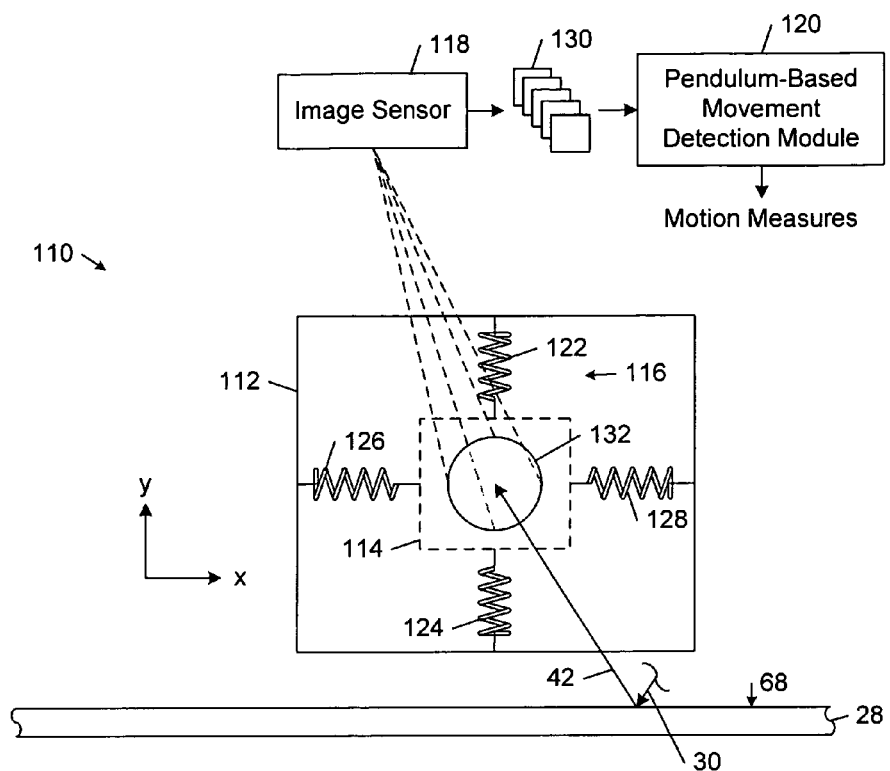
FIG. 6 is a diagrammatic view of an image-based embodiment of the specular reflection capture system shown in FIG. 1.

FIG. 6 shows an embodiment 110 of the specular reflection capture system 16 that includes a support 112, a pendular element 114, an elastic restraint 116, an image sensor 118, and a pendulum-based movement detection module 120. The specular reflection capture system 110 is capable of measuring static or low frequency accelerations, such as those commonly occurring during movement of the input device 10 in relation to a surface.

The support 112 may be implemented by any type of structure that defines an inertial reference frame of the specular reflection capture system 110. In some implementations, the support 112 is part of the body or housing of the input apparatus 10 or is a structure that is connected rigidly to the body or housing of the input apparatus 110.

The elastic restraint 116 electrically couples the pendular element 114 to the support 112. In general, the elastic restraint 116 may be implemented by any type of material or structure that is capable of deforming in a way that allows the pendular element 114 to move relative to the support 112 in at least one direction in response to an inertial force that is produced by acceleration of the input device 10. In the illustrated embodiment, the elastic restraint 116 includes a first elastic element 122, a second elastic element 124, a third elastic restraint 126, and a fourth elastic restraint 128. The first and second elastic elements 122, 124 couple opposite sides of the pendular element 114 to the support 112 along the y-axis. The third and fourth elastic elements 126, 128 couple opposite sides of the pendular element 114 to the support 112 along the x-axis. The elastic elements 122-128 may be implemented by an elastic material, such as a base metal, a metal alloy, a plastic material, an elastomer, or a fibrous material that is capable of elastically stretching. In some embodiments, the elastic elements 122-128 are shaped into any of a wide variety of different spring shapes, including helical, spiral or coil spring shapes, elliptical or half-elliptical leaf spring shapes, flat spring shapes, and volute spring shapes.

The image sensor 118 captures images 130 of the pendular element 114. The image sensor 118 has a field of view 132 that encompasses at least a portion of the pendular element 114 throughout a specified range of motion of the pendular element 114 in the x-y plane. The image sensor 118 may be any type of image sensor, including a charge coupled device (CCD) image sensor or a complementary metal-oxide-semiconductor (CMOS) image sensor. The image sensor 118 may include one or more lenses that focus incoming light that is reflected or transmitted through the pendular element 114 onto the active area of the image sensor 118.

The pendulum-based movement detection module 120 may be part of the processing system 18 or it may be a separate component of the input apparatus 10. The pendulum-based movement detection module 120 is not limited to any particular hardware or software configuration, but rather it may be implemented in any computing or processing environment, including in digital electronic circuitry or in computer hardware, firmware, or software. In one implementation, the pendulum-based movement detection module 120 includes a digital signal processor (DSP).

The pendulum-based movement detection module 120 measures movement of the pendular element 114 based on the one or more locations where the incoming light beam appears in one or more of the images 130 that are captured by the image sensor 118. In some implementations, the pendulum-based movement detection module 120 determines the direction and distance by which the pendular element 114 is displaced from blurred images of the incoming light beams in respective ones of the images 130 that are captured by the image sensor 118. In other implementations, the pendulum-based movement detection module 120 determines the movement of the pendular element by tracking the movement of the incoming light beam across successive ones of the images 130. The pendulum-based movement detection module 120 converts the determined displacement values (e.g., $\vec{\Delta x}$) into a measure of the acceleration ($\vec{a}_{EFF}$) of the support 112 (and hence the input apparatus 10) in accordance with equation (1):

$$\vec{a}_{EFF} = \frac{k_{EFF}}{m} \cdot \vec{\Delta x} \quad (1)$$

where $\vec{a}_{EFF}$ is the effective acceleration, $k_{EFF}$ is the effective spring constant of the elastic restraint 116 and m is the mass of the pendular element 114. The effective acceleration $\vec{a}_{EFF}$ corresponds to the net acceleration due to the acceleration ($a_{PENDULAR}$) of the pendular element 114 and the gravitational acceleration ($\vec{g}$). That is:

$$\vec{a}_{EFF} = \vec{a}_{PENDULAR} - \vec{g} \quad (2)$$

The pendulum-based movement detection module 120 determines the velocity of the input apparatus 10 during a specified period by performing a single time integration (or summing) of the acceleration measures over the specified period. The pendulum-based movement detection module 120 determines the displacement of the input apparatus 10 during a specified period by performing two time integrations of the acceleration measures over the specified period.

Figure 7:
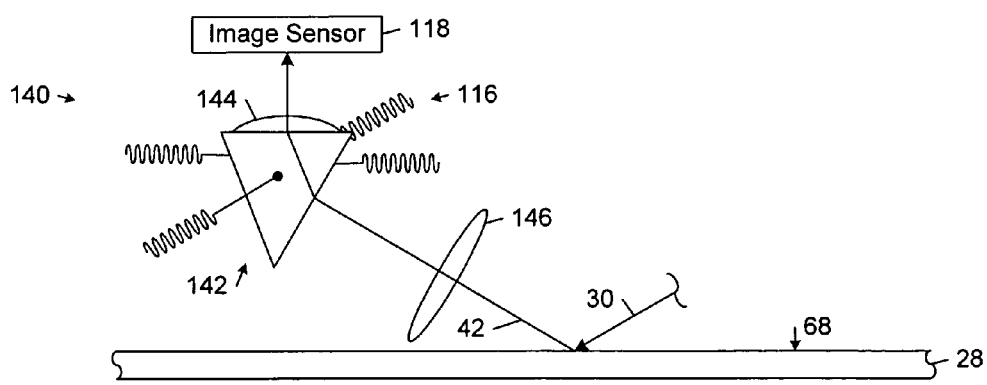
FIG. 7 is a diagrammatic view of an embodiment of the specular reflection capture system shown in FIG. 6.

FIG. 7 shows an embodiment 140 of the specular reflection capture system 110. In this embodiment, the pendular element 114 includes a prism 142 with a lenticular surface 144. An optical element 146 focuses the incoming specular reflections 42 onto a receiving face of the prism 142. The prism 142 refracts the received light toward the lenticular surface 144, which focuses the light onto a capture plane of the image sensor 118. Acceleration of the input apparatus 10 displaces the prism 142 and thereby causes the location in the capture plane of the image sensor 118 where the received light is focused by the lenticular surface 144 of the prism 142.

Figure 8:
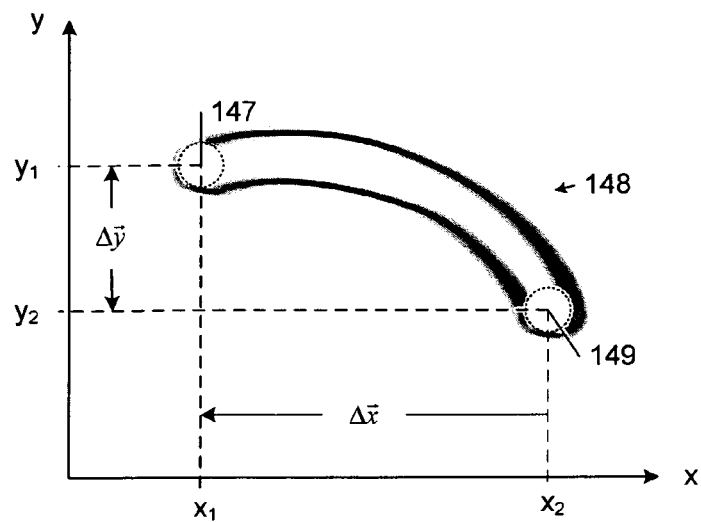
FIG. 8 is a diagrammatic view of a devised blurred image of a specularly reflected light beam captured by an embodiment of the specular reflection capture system shown in FIG. 6.

FIG. 8 shows a devised blurred image 148 of a specularly reflected light beam that is captured by the specular reflection capture system 140. This image 148 is intended to depict the arcuate trace of a light beam that is focused by the lenticular surface 144 during the exposure period of one of the captured images 130. With respect to this exemplary illustration, the pendulum-based movement detection module 120 determines motion measures by determining the initial and final positions 147, 149 of the focused light beam over the exposure period. In general, the pendular-base movement detection module 120 may use any type of motion estimation process to determine these initial and final positions of the focused light beam in the captured images. In some implementations, the pendulum-based motion detection module 120 uses blind motion estimation techniques that commonly are used to estimate motion vectors in motion deblurring and image restoration processes. As shown in FIG. 8, in one implementation, the pendulum-based movement detection module 120 determines the displacement vectors ($\vec{\Delta x}, \vec{\Delta y}$) from the centroids ($x_1, y_1$) and ($x_2, y_2$) of the estimated initial and final positions 147, 149 of the focused light beam. The pendulum-based movement detection module 120 then determines the motion measures from the displacement vectors in accordance with the method described above.

The processing system 18 typically controls the exposure period and the rate at which the image sensor 118 captures the images 130 of the incoming light that is reflected or transmitted through the pendular element 114. In some embodiments, the frame rate is fixed at a level that enables relative movements of the input apparatus 10 to produce blur traces in the images 130 from which the pendulum-based movement detection module 120 is able to extract motion measures. In other embodiments, the processing system 18 adjusts the frame rate dynamically in response to changes in the rate at which the input apparatus 10 is moved in relation to the object 28. In some embodiments, the frame rate is increased in response to a determination that the extracted motion measures exceed a specified threshold value. For example, in some of these embodiments, the processing system 18 increases the frame rate if the following condition is met:

$$f(\Delta \vec{x}, \Delta \vec{y}) \geq \Lambda \quad (3)$$

where $f(\Delta \vec{x}, \Delta \vec{y})$ is a function and $\Lambda$ is an empirically determined threshold. In these embodiments, the processing system 18 decreases the frame rate if the condition defined in equation (3) is not satisfied. In some of these embodiments, the function $f(\Delta \vec{x}, \Delta \vec{y})$ corresponds to a vector norm of the type defined by equation (4):

$$f(\Delta \vec{x}, \Delta \vec{y}) = \left(|\Delta \vec{x}|^L + |\Delta \vec{y}|^L\right)^{\frac{1}{L}} \quad (4)$$

where L corresponds to a positive integer that specifies the type of vector norm. The vector norm for L=1 typically is referred to as the L1-norm and the vector norm for L=2 typically is referred to as the L2-norm. In other ones of these embodiments, the processing system may adjust the frame as a continuous function of the displacement vector ($\Delta \vec{x}, \Delta \vec{y}$).

BY dynamically adjusting the frame rate of the image sensor in response to changes in the relative movement of the input apparatus 10, these embodiments are able to accommodate devices that have significant processing and memory resource constraints.

2. Exemplary Interferrence-Based Capture System Embodiments

In the embodiments of the input apparatus 10 that include any of the following interference-based capture system embodiments, the illumination system 12 is implemented by a coherent light source 150. The coherent light source 150 produces a source of a beam of light that has sufficient temporal coherence and sufficient spatial coherence to produce detectable interfering radiation waves in the mixing components of these embodiments. The coherent light source 150 typically is implemented by a semiconductor laser (e.g., a vertical cavity surface emitting laser or an edge emitting laser).

Figure 9:
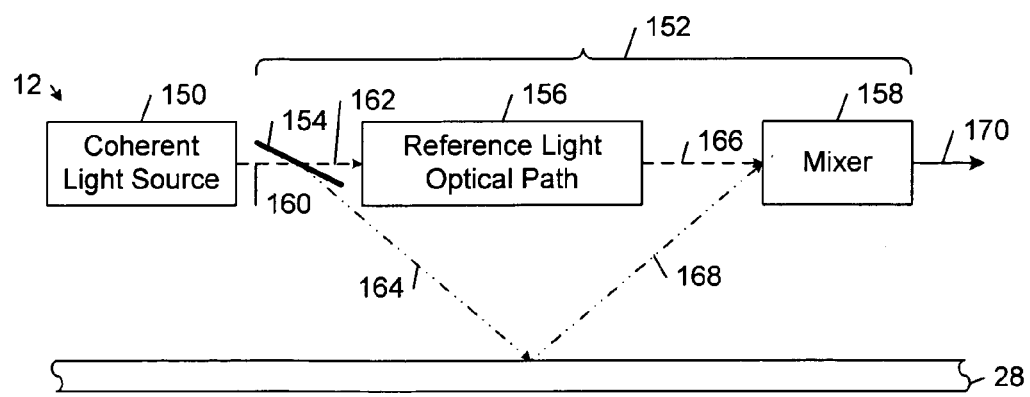
FIG. 9 is a block diagram of an embodiment of an interference-based capture system shown in FIG. 1.

FIG. 9 shows an embodiment of an interference-based capture system 152 that may be used as one or both of the diffuse reflection capture system 14 and the specular reflection capture system 16. The capture system 152 includes a beam splitter 154, a reference light optical path 156, and a mixer 158. In operation, the coherent light source 150 generates a beam 160 of coherent light. The beam splitter 154 divides the coherent light beam into a reference light beam 162 and an output beam 164. The reference light beam 162 passes through the reference light optical path 156, which may include one or more optical elements that guide, shape, and/or modify the reference light beam 162 to produce an output reference light beam 166. The output light beam 164 illuminates the object 28 and produces incoming light 168 that includes at least one of diffuse reflections and specular reflections of the output light beam 164. The mixer 158 mixes the incoming light 168 and the reference light beam 166 to produce an interferometric output signal 170 from which the process system 18 can determine the movement of the input apparatus 10 in relation to the object 28. The mixer 158 typically is implemented by a light sensor (e.g., a single photodetector, or a one-dimensional or two-dimensional array of photodetectors).

Figure 10:
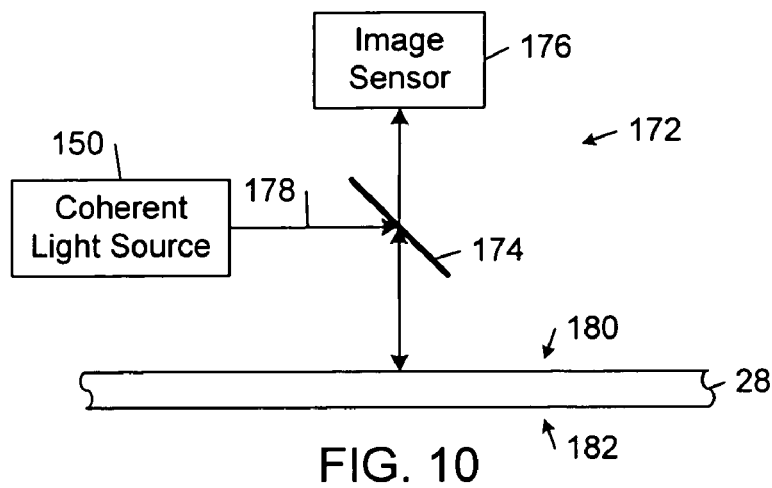
FIG. 10 is a block diagram of an interference-based embodiment of the diffuse reflection capture system shown in FIG. 1.

FIG. 10 shows an embodiment of an interference-based capture system 172 that includes a beam splitter 174 and an image sensor 176. In operation, the coherent light source 150 generates an output beam 178 of coherent light. The beam splitter 174 directs the output beam 178 toward the object 28, receives an incoming light beam along substantially the same path, and transmits the incoming beam to the image sensor 176.

In implementations of the input apparatus 10 in which the capture system 172 is used as the diffuse reflection capture system 14, the object 28 may include optical non-uniformities that modify the output beam 178 to produce the incoming light beam with phase patterns that differ from the output beam 178 in ways that are unique to each location across the object 12. In these cases, the image sensor 176 is able to detect changes in the unique phase patterns in the incoming beam that result from relative movement of the input apparatus 10 and the object 28 based on correlations between successive pairs of images of the incoming light beam. Additional details regarding the structure and operation of this implementation of the capture system 172 may be obtained from U.S. Patent Application Publication No. 2004/027954, which is incorporated herein by reference.

In implementations of the input apparatus 10 in which the capture system 172 is used as the specular reflection capture system 16, the object 28 may be substantially transparent to the output light beam 178. In these implementations, a first portion of the output light beam 178 reflects off the front surface 180 of the object 28 to form a first reflected light beam. A second portion of the output light beam 178 travels through the object 28 to an illumination area on the back surface 182, where it reflects off the back surface 182 and travels back through the object 28 and out the front surface 180 in an exit area to form of a second reflected beam. The first and second reflected beams overlap in a region of space to produce an interference beam that includes an interference pattern. The image sensor 176 captures images of the interference beam. Depending on the implementation, either the image sensor 176 or the processing system 18 produces motion measures that are indicative of movement of the input apparatus in relation to the object 28 from comparisons of ones of the images that are captured by the image sensor 176. Additional details regarding the structure and operation of this implementation of the capture system 172 may be obtained from U.S. patent application Ser. No. 11/403,720, which has a filing date of Apr. 13, 2006, and is incorporated herein by reference.

Figure 11:
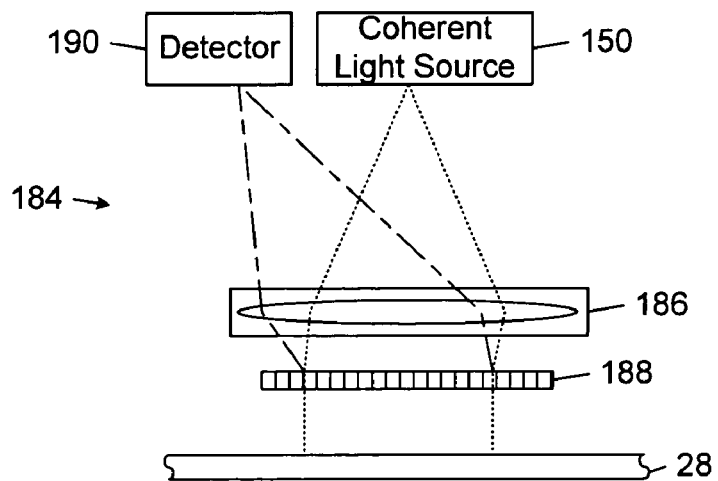
FIG. 11 is a block diagram of an interference-based embodiment of the diffuse reflection capture system shown in FIG. 1.

FIG. 11 shows an interference-based embodiment 184 of the diffuse reflection capture system 14 that includes an optical lens system 186, a grating 188, and a detector 190. In operation, the grating 188 reflects part of the output beam 192 back toward the optical lens system 186, which focuses the grating-reflected beam onto a capture plane of the detector 190. Another part of the output beam 192 passes through the grating and illuminates the object 28. A portion of the illuminating output beam is reflected off the object 28, passed back through the grating, and focused by the optical lens system 186 onto the capture plane of the detector 190. The detector 190 mixes the grating-reflected beam and the object-reflected beam. The processing system 18 determines motion measures that are indicative of movement of the input apparatus in relation to the object 28 from the output signal that is produced by the detector 190 in accordance with a homodyne detector process. Additional details regarding the structure and operation of the capture system 184 may be obtained from U.S. Pat. No. 6,741,335, which is incorporated herein by reference.

Figure 12:
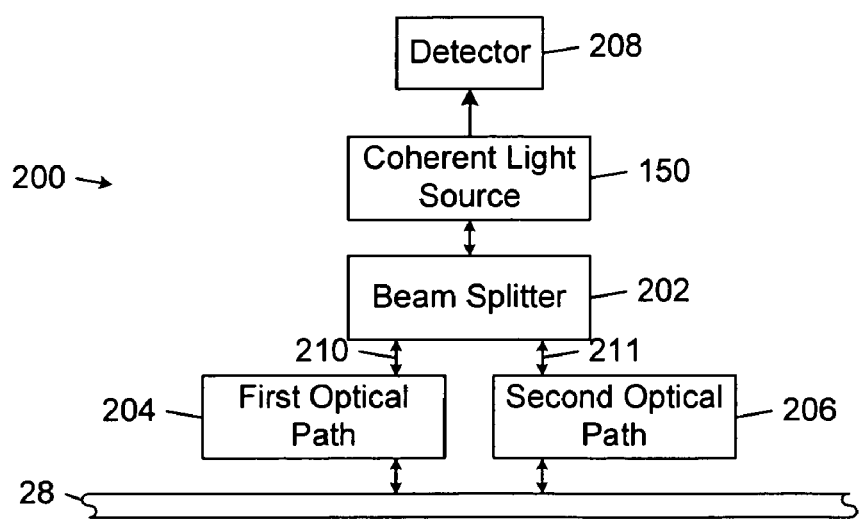
FIG. 12 is a block diagram of an interference-based embodiment of the diffuse reflection capture system shown in FIG. 1.

FIG. 12 shows an interference-based embodiment 200 of the diffuse reflection capture system 16 that includes a beam splitter 202, a first optical path 204, a second optical path 206, and a detector 208. The first and second optical paths 204 and 206 have different optical lengths. In operation, the coherent light source 150 produces an output light beam 208 that is divided into two sub-beams 210, 211. Respective portions of the sub-beams 210, 211 are reflected from the object 28 and directed back to a cavity of the coherent laser source 150 where they undergo self-mixing. At least one characteristic (e.g., frequency changes, asymmetry, and amplitude changes in a Doppler waveform) of each of the sub-beams 210, 211 is modified by self-mixing effects within the cavity. The detector 208 produces an output signal from the modified coherent light produced by the coherent light source 150. The processing system 18 determines motion measures that are indicative of movement of the input apparatus in relation to the object 28 from the modified characteristics of the sub-beams 210, 211. Additional details regarding the structure and operation of the capture system 200 may be obtained from U.S. Patent Application Publication No. 2006/0072102, which is incorporated herein by reference.

B. Exemplary Illumination System Embodiments

In general, the illumination system 12 includes at least one light source that is capable of illuminating the object 28 with output light 30 within a specified wavelength range. Exemplary light sources include light emitting diodes, single-mode lasers, and multimode lasers. The illumination system 12 also may include one or more optical elements for directing (e.g., shaping, focusing, or changing the propagation path of) the output light 30 to an illumination area of the front surface of the object 28.

In some embodiments, the illumination system 12 is configured to produce the output light 30 with a spot light portion and a peripheral light portion. The spot light portion may illuminate a spot of the object 28 with an intensity profile that is optimized for producing the specular reflections 42, whereas the peripheral light portion may illuminate one or more areas of the object 28 with an intensity profile that is optimized for producing the diffuse reflections 34.

Figure 13:
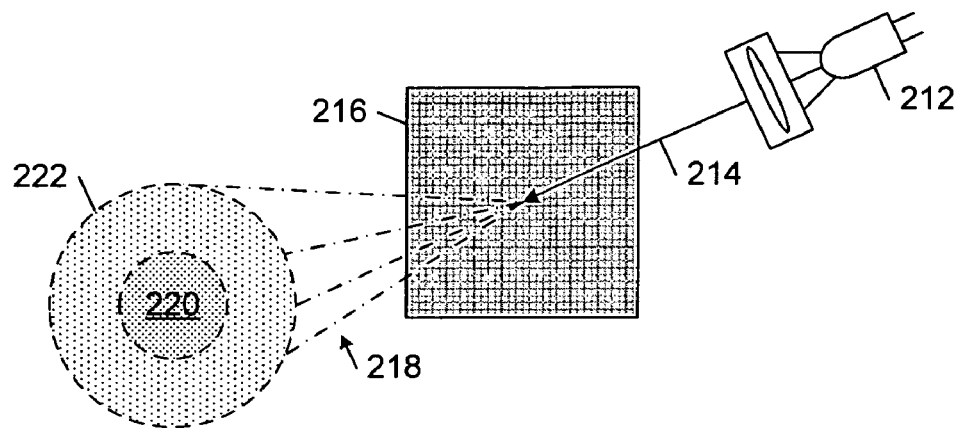
FIG. 13 is a diagrammatic view of an embodiment of the illumination system shown in FIG. 1.

FIG. 13 shows an embodiment 210 of the illumination system 12 that includes a light source 212 that produces source light 214 and a mask 216 that modifies the source light 214 to produce output light 218 having a spot light portion 220 that illuminates an area of the object 28 and a peripheral light portion 222 that illuminates areas of the object 28 adjacent the area illuminated by the spot light portion 220. In embodiments in which the light source 212 is a light-emitting diode, the mask 216 typically is implemented by a patterned stencil. In embodiments in which the light source 212 is a laser, the mask 216 typically is implemented by a hologram.

In some embodiments, the mask 216 modifies the source light 214 such that the spot light portion 220 illuminates a first region of the object 28 with a first average light intensity and the peripheral light portion 222 illuminates a second region of the object 28 with a second average light intensity lower than the first average light intensity.

Figure 14:
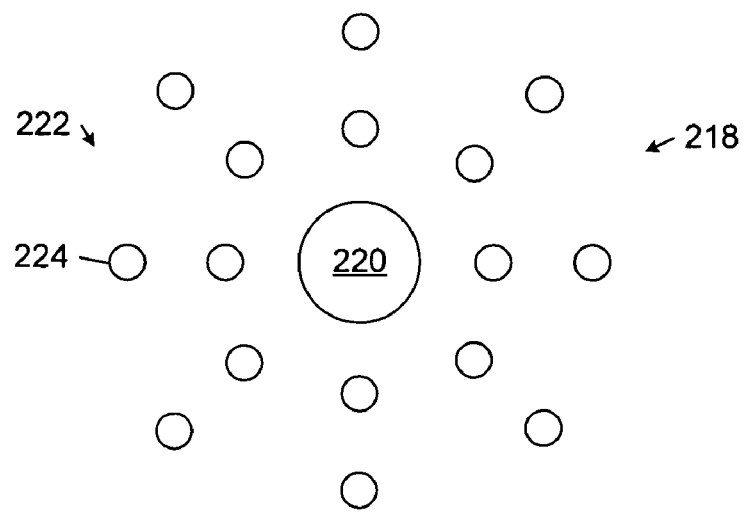
FIG. 14 is a diagrammatic view of a transverse cross section of output light produced by an embodiment of the illumination system shown in FIG. 13.

FIG. 14 shows a transverse cross-section of the output light 218 that is produced by an exemplary embodiment of the mask 216. In accordance with this embodiment, the mask 216 modifies the source light 214 to produce the output light 218 with the spot light portion 220 in a central region of the transverse cross-section of the output light 218 and the peripheral light portion 222 with multiple light beams 224 distributed in a peripheral region of the transverse cross-section of the output light 218 around the spot light portion 220.

C. Exemplary Processing System Embodiments

The processing system 18 may be implemented by one or more discrete modules that are not limited to any particular hardware or software configuration. The one or more modules may be implemented in any computing or processing environment, including in digital electronic circuitry (e.g., an application-specific integrated circuit, such as a digital signal processor (DSP)) or in computer hardware, firmware, device driver, or software.

In some implementations, computer process instructions for implementing the modules of the process system 18 and the data generated by these modules are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD/DVD-ROM.

V. Conclusion

The embodiments that are described herein provide input apparatus that include multiple capture systems that are designed to capture light reflections from different types of surfaces. In this way, these embodiments enable optical navigation over multiple types of surfaces (e.g., opaque surfaces, specular surfaces, smooth surfaces containing optical non-uniformities, and smooth surfaces that are free of specular nonuniformities) using a single input apparatus.

Other embodiments are within the scope of the claims.

What is claimed is:

1. An input apparatus, comprising:
   an illumination system operable to illuminate an object with output light;
   a diffuse reflection capture system operable to capture diffuse reflections of the output light from the object and produce diffuse reflection optical data from the captured diffuse reflections;
   a specular reflection capture system operable to capture specular reflections of the output light from the object and produce specular reflection optical data from the captured specular reflections; and
   a processing system operable to produce a first set of motion measures indicative of movement of the input apparatus in relation to the object from the diffuse reflection optical data and to produce a second set of motion measures indicative of movement of the input apparatus in relation to the object from the specular reflection optical data, wherein the processing system is operable to select one of a diffuse reflection tracking state and a specular reflection tracking state based on an assessment of a tracking quality of light received by at least one of the diffuse reflection capture system and the specular reflection capture system, wherein the processing system outputs motion measures in the first set during the diffuse reflection tracking state whereas the processing system outputs motion measures in the second set during the specular reflection tracking state.

2. The input apparatus of claim 1, further comprising a housing containing the illumination system, the diffuse reflection capture system, and the specular reflection capture system, wherein the housing comprises a registration surface, the illumination system is configured to direct at least one output light beam out of the housing along an outgoing beam path at an acute angle $\theta_{OUT}$ greater than zero relative to a normal direction perpendicular to the registration surface, the specular reflection capture system is configured to capture at least a portion of the output light beam specularly reflected from the object into the housing along an incoming beam path at an angle $\theta_S$ relative to the normal direction that is equal to $\theta_{OUT}$.

3. The input apparatus of claim 2, wherein the diffuse reflection capture system is configured to capture at least a portion of the output light beam diffusely reflected from the object into the housing along a range of incoming beam paths including the normal direction.

4. The input apparatus of claim 1, wherein the diffuse reflection capture system is operable to capture images of the diffuse reflections, and the processing system produces motion measures in the first set from comparisons of ones of the images captured by the diffuse reflection capture system.

5. The input apparatus of claim 1, wherein the specular reflection capture system is operable to capture images of the specular reflections, and the processing system is operable to determine motion measures in the second set from blurred images of specularly reflected light beams in respective ones of the images captured by the specular reflection capture system.

6. The input apparatus of claim 5, wherein the processing system is operable to determine features of intra-exposure traces of the specularly reflected light beams corresponding to the blurred images and to determine motion measures in the second set from the determined features.

7. The input apparatus of claim 6, wherein the processing system controls a rate at which the specular reflection capture system captures images of the specular reflections in response to comparisons of ones of the determined features to a threshold.

8. The input apparatus of claim 1, wherein the processing system is operable to select one of the diffuse reflection tracking state and the specular reflection tracking state based on at least one tracking quality measure.

9. The input apparatus of claim 8, wherein the diffuse reflection capture system is operable to capture images of the diffuse reflections, and the processing system derives saliency measures from images captured by the diffuse reflection capture system and determines the at least one tracking quality measure from the saliency measures.

10. The input apparatus of claim 1, wherein the specular reflection capture system comprises:
   an image sensor having a capture plane;
   a pendular element comprising an optical element operable to focus the captured specular reflections onto a region of the capture plane; and
   an elastic restraint coupling the pendular element to a support and operable to apply to the pendular element a restraining force that opposes movement of the pendular element in at least a first direction;
   wherein movement of the pendular element moves the region in the capture plane where the optical element focuses the capture specular reflections.

11. The input apparatus of claim 1, wherein the illumination system comprises a laser that produces a laser beam and an optical system that is operable to produce the output light from at least a portion of the laser beam, and the specular reflection capture system comprises an interferometer that mixes the specular reflections with reference light derived from the laser beam to produce an interferometer output signal, and the processing system produces motion measures in the first set from the interferometer output signal.

12. The input apparatus of claim 1, wherein the illumination system comprises a laser that produces a laser beam and an optical system that is operable to produce the output light from at least a portion of the laser beam, and the diffuse reflection capture system comprises an interferometer that mixes the diffuse reflections with reference light derived from the laser beam to produce an interferometer output signal, and the processing system produces motion measures in the second set from the interferometer output signal.

13. The input apparatus of claim 1, wherein the illumination system comprises a laser that produces a laser beam and an optical system that is operable to produce the output light from at least a portion of the laser beam, and the diffuse reflection capture system comprises an optical system that directs the diffuse reflections into a self-mixing cavity of the laser, the laser additionally produces a second laser beam, the diffuse reflection capture system additionally comprises a light sensor that produces a detection signal from the second laser beam, and the processing system produces motion measures in the first set from the detection signal.

14. The input apparatus of claim 1, wherein the illumination system comprises a light source that produces source light and a mask that modifies the source light to produce the output light having a spot light portion that illuminates an area of the object and a peripheral light portion that illuminates areas of the object adjacent the area illuminated by the spot light portion.

15. The input apparatus of claim 14, wherein the mask modifies the source light such that the spot light portion illuminates a first region of the object with a first average light intensity and the peripheral light portion illuminates a second region of the object with a second average light intensity lower than the first average light intensity.

16. The input apparatus of claim 15, wherein the mask modifies the source light to produce the output light having a transverse cross section with the spot light portion in a central region and the peripheral light portion comprising multiple light beams distributed in a peripheral region around the spot light portion.

17. The input apparatus of claim 14, wherein the light source is a light-emitting diode and the mask comprises a stencil.

18. The input apparatus of claim 14, wherein the light source is a laser and the mask comprises a hologram.

19. The input apparatus of claim 1, wherein the processing system is further configured to:
   derive a saliency measure from the diffuse reflection optical data, wherein the saliency measure indicates a visual quality of the captured diffuse reflections;
   determine an intensity of the captured specular reflections based on the specular reflection optical data and compare the intensity of the captured specular reflections with an intensity threshold; and
   perform the assessment of the tracking quality of light based on the saliency measure corresponding to the diffuse reflection optical data and the intensity corresponding to the specular reflection optical data.

20. An input system, comprising:
   means for illuminating an object with output light;
   means for capturing diffuse reflections of the output light from the object;
   means for producing diffuse reflection optical data from the captured diffuse reflections;
   means for capturing specular reflections of the output light from the object;
   means for producing specular reflection optical data from the captured specular reflections;
   means for producing a first set of motion measures indicative of movement of the input system in relation to the object from the diffuse reflection optical data;

means for producing a second set of motion measures indicative of movement of the input system in relation to the object from the specular reflection optical data;

means for selecting a diffuse reflection tracking state or a specular reflection tracking state based on an assessment of a tracking quality of light corresponding to at least one of the diffuse reflection optical data or the specular reflection optical data; and means for outputting motion measures in either the first set during the diffuse reflection tracking state or the second set during the specular reflection tracking state.

21. A method for determining relative motion between an input device and an object, the method comprising:

illuminating the object with output light;

capturing diffuse reflections of the output light from the object;

producing diffuse reflection optical data from the captured diffuse reflections;

capturing specular reflections of the output light from the object;

producing specular reflection optical data from the captured specular reflections;

producing a first set of motion measures indicative of movement of the input device in relation to the object from the diffuse reflection optical data;

producing a second set of motion measures indicative of movement of the input device in relation to the object from the specular reflection optical data;

selecting a diffuse reflection tracking state or a specular reflection tracking state based on an assessment of a tracking quality of light corresponding to at least one of the diffuse reflection optical data or the specular reflection optical data; and outputting motion measures in either the first set during the diffuse reflection tracking state or the second set during the specular reflection tracking state.

* * * * *